May 6, 1952     D. FRIEND ET AL     2,596,070
VALVED CAP FOR AUTOMOBILE RADIATORS AND THE LIKE

Filed March 9, 1949

INVENTOR.
DAWSON FRIEND and
LOWELL J. SMITH,
BY: Harold B. Hood.
ATTORNEY.

Patented May 6, 1952

2,596,070

UNITED STATES PATENT OFFICE 2,596,070

VALVED CAP FOR AUTOMOBILE RADIATORS AND THE LIKE

Dawson Friend and Lowell J. Smith, Connersville, Ind., assignors to Stant Manufacturing Company, Connersville, Ind., a corporation of Indiana Application March 9, 1949, Serial No. 80,466

8 Claims. (Cl. 220—44)

The present invention relates to a valved cap for automobile radiators, and the like, and is particularly concerned with improvements in manufacturing facility, operative stability, and maintenance of uniform sensitivity, over the structure disclosed in our copending application Serial No. 39,518, filed July 19, 1948, and now Patent No. 2,582,209, for Pressure Vacuum Relief Radiator Caps.

The primary object of the present invention is to provide a device of the character under consideration including a pressure-relief valve, dominated by spring means, and of such character that, once calibrated to respond to a predetermined pressure, it will, throughout its effective life, continue to respond correspondingly to that predetermined pressure, without substantial variation. It has been found that, with devices of the prior art, including the device disclosed in our above-identified copending application, the effective strength of the spring backing the pressure relief valve will sometimes vary by a pound or more within the life of the assembly. We have discovered that that variation is due, in large part, if not solely, to the fact that the opposite ends of the spring bear upon relatively rotatable parts so that, as the cap is repeatedly applied to, or removed from, the filler spout with which it is intended to be associated, the spring will sometimes be wound and, at other times, will be unwound, whereby its effective strength is varied. Applying this discovery, we have designed a structure in which, although the relief valve and the cap body are relatively rotatable in order to avoid scuffing of the valve gasket during application or removal of the cap assembly, the opposite ends of the spring bear upon elements which are not relatively rotatable, whereby such winding or unwinding of the spring is prevented.

Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
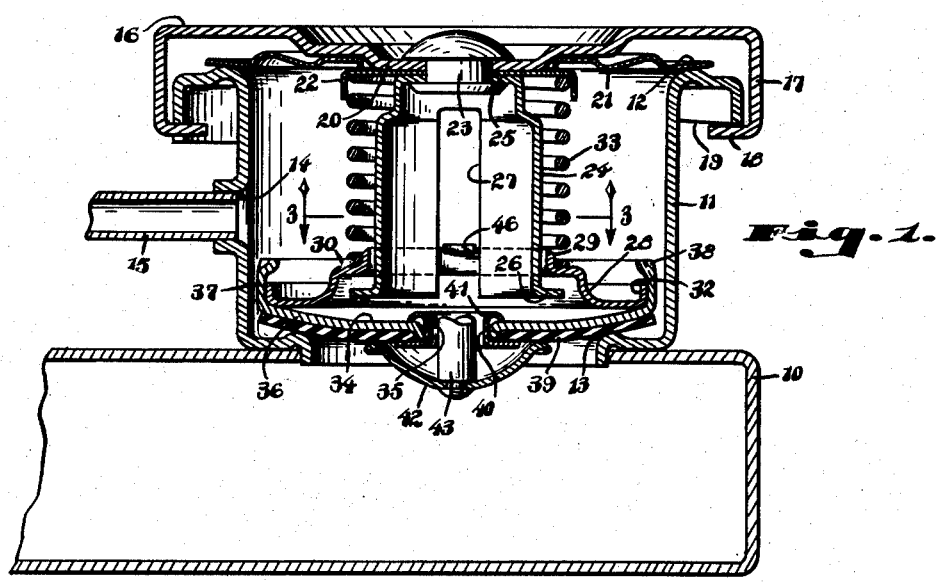
Fig. 1 is a vertical sectional view illustrating a cap assembly constructed in accordance with our present invention, operatively associated with a filler spout of an automobile radiator, parts being broken away for clarity of illustration.

Referring more particularly to the drawings, it will be seen that we have illustrated a portion of a conventional automobile radiator 10 with which is associated a conventional filler spout 11 providing an outer seat 12 and an inner seat 13, axially spaced from each other. A vent port 14 opens from the spout 11 between said seats, and accommodates an overflow pipe 15, all in accordance with standard practice.

Our cap assembly comprises a cap member 16 having an annular axially extending flange 17 from whose lower edge are inturned one or more fingers 18 adapted to cooperate with cam surfaces 19 conventionally provided upon the filler spout 11.

The body of the cap member 16 is centrally deformed, as at 20, to form a rotational bearing for a flexible diaphragm 21 which is loosely journalled upon said deformed portion and which is so related to the fingers 18 that, when the cap is turned down into assembled condition with the spout 11, the peripheral portion of the diaphragm 21 will sealingly engage the seat 12. An abutment element 22 seats against the inner face of the deformed portion 20 of the cap member 16, and limits axial movement of the diaphragm 21 away from the associated cap face. As shown, and preferably, a slight clearance will be provided between the diaphragm 21 and the abutment 22.

We provide means, such as the rivet 23, for fixedly securing the abutment 22 and a hollow, axially elongated domed member 24 to the cap member 16. Said element 24 is provided at its upper end with radially inward projections 25, which may be annularly continuous or which may consist of peripherally spaced, radially inwardly projecting fingers, which projections are fixedly clamped to the cap member 16 by the rivet 23, whereby the element 24 is rigidly connected to said cap member. At its lower or inner end, the element 24 is provided with outturned radial projections 26 which, like the projections 25, may be annularly continuous, may consist of a peripheral series of spaced fingers, or may merely be interrupted by one or more longitudinally extending slots 27, of which two are shown in the illustrated embodiment of the invention. We prefer to construct the element 24 in the manner illustrated, in which the slots 27 open through the lower end of said element, for reasons which are best pointed out in our said copending application.

In the illustrated form of the invention, the element 24 is substantially cylindrical, and a ring or spring seat 28 is mounted upon said element 24 for axial reciprocation with respect thereto.

The inner periphery of the ring 28 is provided with a substantially cylindrical, upturnd flange 29 which may be said to provide a bearing upon the element 24, and the ring 28 provides a spring seat 30, substantially normal to the axis of the element 24, immediately outwardly beyond the flange 29. At its outer periphery, the ring 28 is formed with an upturned, truly cylindrical flange 32 for a purpose which will later appear. A coiled spring 33 surrounds the element 24, being confined between the fixed abutment 22 and the reciprocable ring 28, and urging said ring resiliently into engagement with the projections 26 at the lower end of the element 24.

A cup 34, provided with a central port 35 therein, is formed to present an outer end surface, an annular portion 36 of which is part spherical. If desired, the entire annular end surface of the cup 34 may be part spherical, but we presently prefer to make the region immediately surrounding the port 35 planar, and to make only the outer peripheral portion of the end surface of the cup part spherical, as indicated at 36.

The rim portion of the cup 34 is turned axially upwardly, as at 37, to provide an internal, truly cylindrical surface adapted snugly but rotatably to fit the external surface of the flange 32 of the ring 28. It is to be understood that, while the fit between the flanges 32 and 37 is snug enough to prevent substantial wobbling or tilting between the elements 28 and 34, it is loose enough to permit free relative rotation and axial reciprocation between said elements. The axial extent of the flange 37 is substantially greater than that of the flange 32, and the terminal rim portion of said flange 37 is crimped inwardly, at three or more relatively spaced points, as at 38, after assembly of the cup 34 with the ring 28, to prevent complete separation of said two elements.

Figure 2:
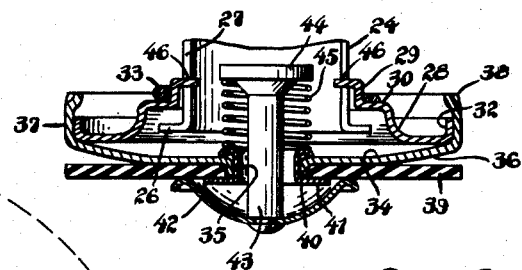
Fig. 2 is a fragmental section, taken upon a plane 90° removed from the plane of Fig. 1, and showing, among other things, details of the vacuum release valve which may preferably form an element of our assembly.
Figure 3:
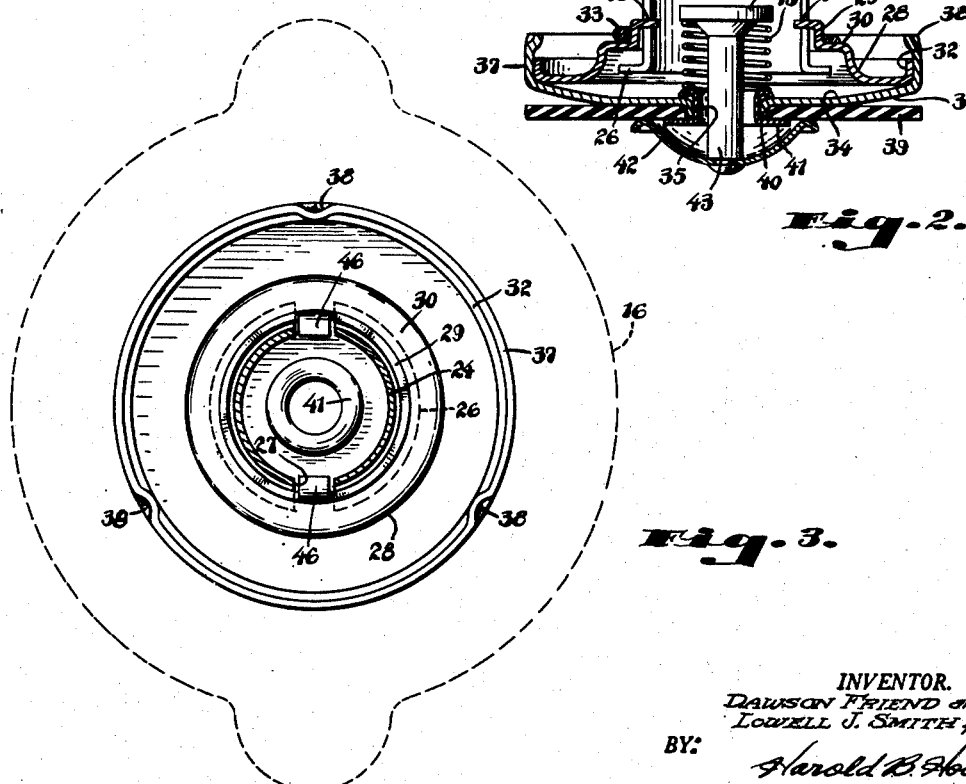
Fig. 3 is a horizontal section, taken substantially on the line 3—3 of Fig. 1, the vacuum relief valve having been removed for clarity of illustration.

A flexible gasket 39 is carried upon the outer end surface of the cup 34, said gasket being formed with a central port 40 adapted to register with the port 35, and being secured to the cup solely by a hollow rivet 41 which passes through said ports 40 and 35. Thus, the peripheral portions of the gasket 39 are free to flex between the positions illustrated in Figs. 1 and 2.

A vacuum release valve 42 is mounted for cooperation with the outer surface of the gasket 39, said valve 42 being so proportioned and designed as to engage an annular surface of the gasket 39 surrounding the registering ports 35 and 40, but within the annular region defined by the seat 13. The valve 42 is supported upon a stem 43 which passes through the hollow rivet 41 and terminates in an enlarged head 44, a spring 45 being confined between said head 44 and the inner surface of the cup 34, and urging the valve 42 resiliently into sealing engagement with the gasket 39.

The ring 28 is provided, at the upper edge of its flange 29 with a number of bendable ears 46 consonant with the number of slots 27 provided in the element 24, and adapted to register concurrently with said slots. After assembly of the ring 28 with said element 24, the ears 46 are bent radially inwardly to their illustrated positions, each such ear then penetrating one of the slots 27. Thus, while the ring 28 is left free to reciprocate relative to the element 24, it is positively held against rotation, relative to said element, about the axis thereof.

Alternatively, of course, the element 24 might be made polygonal in cross section, and the flange 29 of the ring 28 might be similarly formed to cooperate with such polygonal element 24, whereby said ring will be held against rotation relative to the element 24, while remaining free to reciprocate relative thereto. We prefer the illustrated means for preventing such relative rotation, primarily because of its relative simplicity of manufacture, but also because the mentioned alternative construction would be more likely to result in sticking of the ring 28.

It will be seen that the illustrated construction is of such character that the spring 33 exerts no force whatever against the diaphragm 21, whereby the diaphragm is left entirely free for rotation relative to the cap body 16. It will further be seen that one end of the spring bears against the abutment 22, which is fixed with relation to the cap member 16, while the other end of said spring bears against the ring 28 which is non-rotatably fixed with respect to the cap member 16. The gasket 39, however, which engages the seat 13, is carried by the cup 34 which is free for rotation relative to the ring 28. Consequently, when the cap assembly is applied to the spout, and the cap member 16 is rotated with its fingers 18 engaging the cam surface 19, the cap member, abutment 22, element 24, and ring 28 will rotate about the axis of the cap member, and the elements 16, 22 and 24 will thereby be cammed downwardly, as viewed in Fig. 1. Since the gasket 39 presses against the cup 34, the cup 34 and ring 28 will be held against corresponding downward movement, so that such downward movement of the cap member 16 and the parts rigid therewith will result in compression of the spring 33. The cup 34 and gasket 39, however, will not partake of the rotary movement of the ring 28, so that the gasket 39 will not be scuffed against the seat 13. Because the ring 28 and abutment 22 are rotationally fixed relative to the cap member 16, however, the spring 33 will be merely axially compressed, and no tendency toward winding or unwinding of the spring will be exerted thereupon during rotational adjustment of the cap member 16.

It has been found that, in the use of cap assemblies heretofore known, in which one end of a spring similar to the spring 33 bears upon an element rotationally fixed to the cap while the other end thereof bears upon an element capable of rotary movement relative to the cap, the internal radiator pressures which will result in opening movement of the valve engaging the seat corresponding to the seat 13 will vary by as much as one and one-half pounds, depending upon the degree of winding or unwinding to which such spring is subjected during the seating or unseating of the cap assembly. That is, as the assembly is seated, on one occasion, that end of the spring which engages an element rotationally fixed to the cap may be frictionally held against movement relative to such element, and the opposite end of the spring may be similarly frictionally held against movement relative to the element which engages the seat 13. On such an occasion, of course, the seating of the cap will very substantially wind or unwind the spring. On another occasion, one end or the other of the spring may slip completely with respect to its engaged element, in which case the spring will not be wound or unwound at all. Between these two conditions, of course, are all sorts of intermediate possible conditions; and the degree of winding or unwinding of the spring will, in each instance, affect the pressure in response to which the gasket at the lower end of the assembly will leave its sealing association with the seat 13. In our organization, on the other hand, there is never any tendency to wind or unwind the spring 33 during seating or unseating of the cap assembly; and as a consequence, tests have shown that, during a series of thousands of test applications and removals, the pressure under which the gasket 39 will leave the seat 13 will not vary more than a few tenths of one pound.

The provision of the spherical surface 36, of course, assures a perfect sealing engagement between the gasket 39 and the seat 13 upon every application of the assembly, in spite of any tilting of the ring 28 with respect to the element 24, and in spite of any possible variation from coincidence between the axis of the element 24 and the axis of the seat 13.

The particular structure disclosed herein also provides for positive manufacturing control of the maximum distance between the abutments for the opposite ends of the spring 33. Since the upper end of the spring bears upon the fixed abutment 22, while the lower end of the spring bears upon the flat surface 30 of the ring 28, whose ultimate position is determined by the location of the projections 26, the maximum distance between the abutments for the opposite ends of the spring 33 can be maintained with optimum uniformity.

We claim as our invention:

1. In a sealing closure cap for vehicle radiators and the like, a cap member formed for retaining association with a spout, a resilient sealing member loosely engaging the inner surface of said cap member, an elongated hollow element having an upper inturned flange means and a lower outturned flange means, means cooperating with said inturned flange means to secure said hollow element to the inner surface of said cap member, a ring slidably mounted on said hollow element and held against rotary movement relative to said element about the axis thereof, said outturned flange means cooperating with said ring to limit movement thereof axially in one direction relative to said hollow element, abutment means fixed relative to said cap member, a coiled spring confined between said abutment means and said ring, and valve means supported on said ring for rotary movement relative thereto about said axis.

2. The cap of claim 1 in which said abutment means cooperates with said sealing member to limit movement of the latter axially in one direction.

3. In a sealing closure cap for vehicle radiators and the like, a cap member formed for retaining association with a spout, an elongated hollow element provided with radially-extending projections at its opposite end regions, means cooperating with such projections at one end of said element to fix said element to the interior surface of said cap member, a spring seat mounted on said element for reciprocation axially thereof, means restraining said spring seat against rotary movement about the axis of said element relative thereto, said spring seat cooperating with such projections at the other end of said element to limit movement of said spring seat away from said cap member, spring means bearing on said spring seat and resiliently urging said spring seat toward cooperative engagement with said last-named projections, and a valve assembly supported on said spring seat for rotary movement relative thereto about said axis.

4. The cap of claim 3 in which said valve assembly comprises a cup presenting a part-spherical end surface facing away from said cap member and bounded by peripheral, axially-extending flange means telescopically engaging the periphery of said spring seat.

5. The cap of claim 4 including a flexible gasket centrally fixed to said cap at the end surface thereof and substantially coextensive with said surface.

6. In a device of the class described, a cap member formed for retaining association with a radiator filler spout or the like providing two axially-spaced seats, resilient gasket means for sealing association with the outer one of said seats, retainer means fixedly carried upon the inner surface of said cap member and cooperating with said cap member to retain said gasket loosely between said cap member and said retainer means, an annular spring seat, axially-elongated means fixed relative to the inner surface of said cap means and projecting therefrom, said spring seat being mounted on said axially-elongated means for axial movement relative thereto and being held against relative rotary movement about the axis thereof, a coiled spring confined between said retainer means and said spring seat, cooperating means on said spring seat and on said axially-elongated means limiting movement of said spring seat under the influence of said spring, and valve means for sealing association with the inner one of said seats supported on said spring seat for rotary movement relative thereto about said axis.

7. In a device of the class described, a cap member formed for retaining association with a radiator filler spout or the like, said spout providing two axially-spaced seats, pressure-responsive valve elements carried by said cap member for cooperative association with said respective seats, said valve elements being rotatable relative to said cap member about an axis substantially coincident with the axis of said cap member, a coiled spring urging one of said valve elements to move axially relative to said cap member, and abutment elements for both ends of said spring rotationally fixed relative to said cap member.

8. In a device of the class described, a cap member formed for retaining association with a radiator filler spout or the like, a valve element supported from said cap member and movable reciprocably and rotationally relative to said cap member upon an axis substantially coincident with the axis of said cap member, a coiled spring urging said valve element to move axially relative to said cap member, abutment elements for both ends of said spring and means for retaining said abutment elements against rotation relative to said cap member.

DAWSON FRIEND.
LOWELL J. SMITH.

REFERENCES CITED

The following references are of record in the file of this patent:

UNITED STATES PATENTS

| Number | Name | Date |
|---|---|---|
| 2,006,752 | Swank | July 2, 1935 |
| 2,139,395 | Walker | Dec. 6, 1938 |
| 2,164,450 | Eshbaugh et al. | July 4, 1939 |
| 2,302,653 | Lebus | Nov. 17, 1942 |
| 2,406,502 | Lines | Aug. 27, 1946 |
| 2,416,637 | Minella, Jr. | Feb. 25, 1947 |